Figure 1:
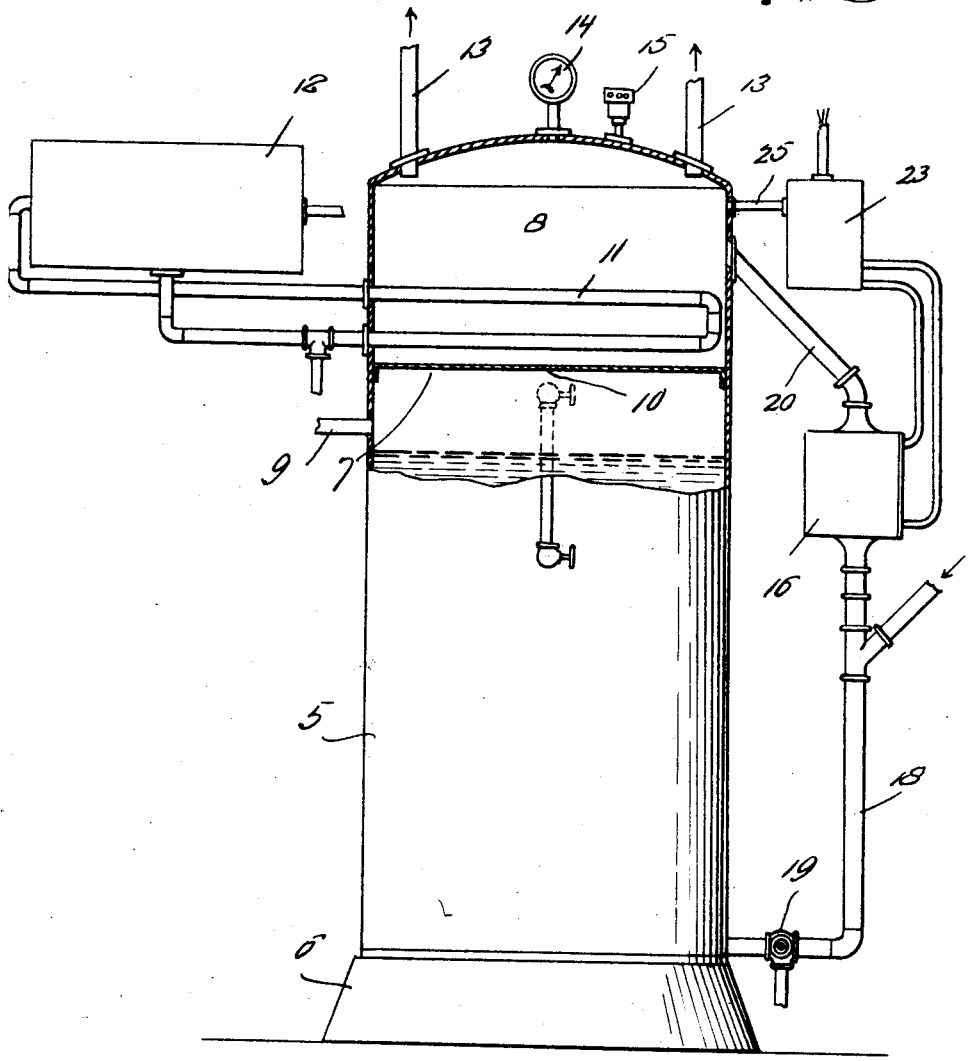

Oct. 15, 1929.  E. O. MILLS  1,731,256
HEATING PLANT
Filed April 7, 1928  2 Sheets-Sheet 1

Inventor
E. O. Mills,
By Clarence A. O'Brien
Attorney

Oct. 15, 1929.　　　　E. O. MILLS　　　　1,731,256
HEATING PLANT
Filed April 7, 1928　　　2 Sheets-Sheet 2

Inventor
E. O. Mills,
By Clarence A. O'Brien
Attorney

Patented Oct. 15, 1929

1,731,256

UNITED STATES PATENT OFFICE

EDGAR OWEN MILLS, OF HAMBURG, IOWA

HEATING PLANT

Application filed April 7, 1928. Serial No. 268,326.

This invention relates to new and useful improvements in heating plants for use in the home, school houses or any other buildings that may require a heating plant, and aims to provide a highly novel, simple and extremely efficiently operating device that is of the electrical variety.

The provision of a heating plant of this character will overcome all of the disadvantages in hand in the use of heating plants of the coal, wood or oil burning variety. Furthermore, means is provided to automatically control the current voltage passing through the heating unit so as to maintain an even temperature at all times.

It is of course well known that in the use of heating plants using coal, wood, oil and other materials the products of combustion escape to a certain degree permeating the entire house or building which is very annoying. Furthermore it is not uncommon for the pilot lights of oil burners to become extinguished which usually results in the flooding of the plant by the oil flowing through the pilot light.

All of these disadvantages are overcome and this through the provision of an unusually simply constructed and inexpensive structure comprising the present invention.

An important object of this invention resides in the provision of automatic means for reducing the current voltage flowing to the electric motor when the temperature or steam pressure within the heating plant reaches a predetermined high point the automatic means also operating to control and increase current voltage passing to the heating unit when the temperature or pressure drops.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:—

Figure 2:
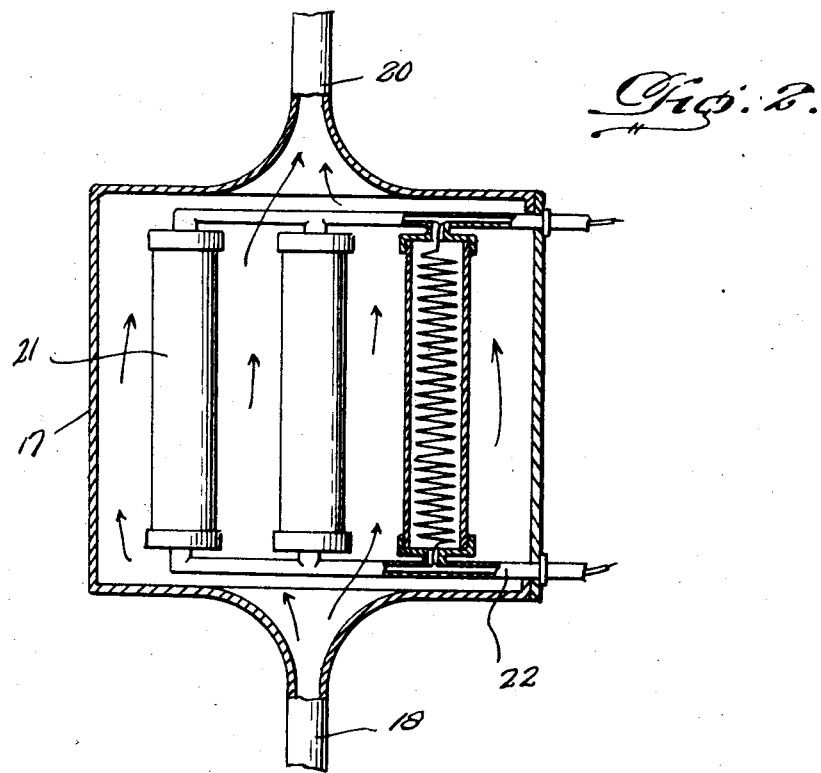
Figure 3:
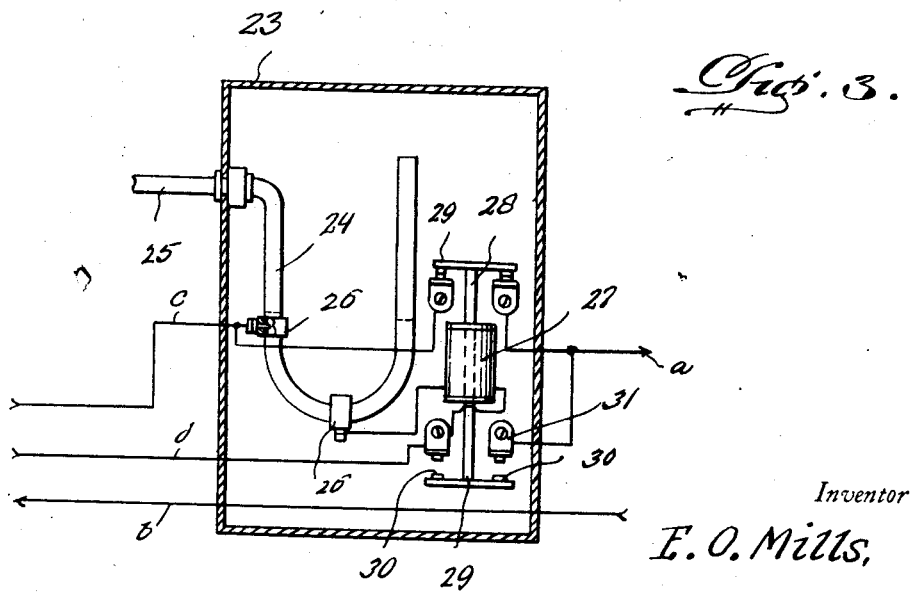

Figure 1 is a view mainly in side elevation and partially in cross section of my improved heating plant, Figure 2 is a detail sectional view through the electrical heating unit, and Figure 3 is a cross section through the automatic voltage regulator showing this regulator structure in elevation and also illustrating the electrical wiring of the regulator.

Now having particular reference to the drawings, 5 designates a cylindrical water tank having a suitable supporting structure 6 at its lower end there being arranged within the upper end of the tank 5 a horizontal wall 7 for providing a steam chamber 8 within the upper end of the tank. Leading into the tank beneath this horizontal wall 7 is a water intake pipe 9 while the center of the wall 7 is provided with a condensation escape opening 10.

Arranged within the steam chamber 8 at the upper end of the tank 5 is a hot water coil 11 that communicates with a hot water storage tank 12 whereby hot water may be conveyed to the various outlets within the building.

The top wall of the steam chamber 8 is constructed with suitable steam outlet pipes 13 as well as a pressure gauge 14 and a safety blow-off valve 15.

Arranged at the side of the tank 5 and beneath the normal level of the water therein is an electrical heating unit designated generally by the reference character 16. This heating unit consists of a suitable watertight housing 17 having communication with an inlet pipe 18 at its lower end which pipe communicates with the bottom of the tank 5 through a combination inlet and drain valve 19. Leading from the top wall of this heating unit housing 17 is a steam exhaust pipe 20 that communicates with the heating chamber 8 at the upper end of the tank 5. Within the housing 17 are three or more protected electrical coils 21 the wires leading to which are arranged through suitable conduits 22.

The automatic regulator for controlling the flow of electrical current to the coils 21 of the heating unit consists of a suitable casing 23 within which is perpendicularly arranged a mercury containing goose-neck tube 24 one end of which has communication with the steam chamber 8 through the medium of a steam conducting pipe 25.

Arranged around this tube 24 at its extreme low point and adjacent the high point of the mercury therein toward the steam inlet end of the tube are suitable conducting members 26—26 that are constructed with any desired means engaging within the tube for contacting the mercury therein.

Arranged within the housing 23 at one side of this mercury tube 24 is the electro-magnet 27 having an elongated core pin 28 slidable therethrough the opposite ends of this core pin being equipped with core prongs 29—29 each of which carries adjacent its opposite ends and at its inner face contact points 30—30 for engagement with complemental contact units 31—31 arranged at opposite ends of the magnet as clearly disclosed in Figure 3.

Leading from the outermost contact member 31 at opposite ends of the magnet 27 is an outward wire $a$ that extends to the coils 21 within the heating unit 16 the return wire being designated by the reference character $b$. Connected to the uppermost mercury tube contact unit 26 and to the inner one of the uppermost pair of contacts 31 is a 110 volt current conducting wire $c$ while in circuit with the lowermost mercury tube contact unit 26, through the magnet 27 an inner one of the lowermost pair of contact units 31 is a 220 volt current conducting wire $d$ the 220 volt current conducting wire leading from a conventional city transformer while the 110 volt current conducting wire leads from the regular city current.

Any suitable manually controlled switch may be arranged within the circuit so as to completely cut out the flow of current to the regulator herein shown and described.

Obviously when water is within the tank 5 and the level of the same is substantially that as disclosed in Figure 1 the water will enter the casing of the heating unit 16 with the obvious result that this water will be converted into steam by the electrical heating unit when in operation which steam is conducted to the steam chamber 8. When the pressure within the steam chamber 8 is at a predetermined low degree the level of the mercury within the tube 24 is substantially that as disclosed in Figure 3. The current primarily flowing through the 110 volt line $c$ will be conducted by the mercury between the two contact members 26—26 thence through the magnet 27 energizing the same whereupon the core pin 28 will raise for bridging the lowermost pair of contacts 31—31 completing the 220 volt circuit to the coil within the heating unit.

As soon as the pressure within the chamber 8 has reached a predetermined degree the mercury at the inner leg of the tube 24 is forced downwardly for breaking the circuit through the mercury between the contacts 26—26. The circuit being broken by the magnet 27 the core pin will drop for bridging the circuit between the uppermost contact members 31—31, thus completing the 110 volt current circuit to the coils of the heating unit. Obviously this control feature will result in the maintenance of a uniform heat.

In view of the foregoing description when considered in conjunction with the accompanying drawings it will be apparent that I have provided a highly novel, simple and extremely efficient heating plant that is well adapted for all of the purposes heretofore designated, and even though I have herein shown and described the invention as consisting of certain detail structural elements it is nevertheless to be understood that some changes may be made therein without affecting the spirit and scope of the appended claim.

Having thus described my invention what I claim is:—

In heating plant of the character described, a water tank, a steam chamber associated with the tank a heating unit consisting of a casing having communication at one end with the water tank and at its opposite end with the steam chamber, an electric coil in the casing, a pair of parallel current lines of different voltage having a common output to the coil, and pressure responsive means within the parallel lines and between the coil and the source of current for automatically governing the flow of current of the two lines to said coil, said means consisting of a mercury tube having communication at one end with the steam chamber and electro-magnetic means cooperating with said mercury tube for changing the current output from the higher voltage line to the lower voltage line when the pressure in the steam chamber reaches a predetermined high degree.

In testimony whereof I affix my signature.

EDGAR OWEN MILLS.